United States Patent
Chou et al.

(10) Patent No.: US 10,956,498 B2
(45) Date of Patent: Mar. 23, 2021

(54) SCANNING FOR BINDINGS IN WEBPAGE MARKUP

(71) Applicant: Google LLC, Mountain View, CA (US)

(72) Inventors: William Chou, Jersey City, NJ (US); Malte Ubl, Alameda, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/720,832

(22) Filed: Sep. 29, 2017

(65) Prior Publication Data

US 2019/0102475 A1 Apr. 4, 2019

(51) Int. Cl.
*G06F 1/00* (2006.01)
*G06F 16/84* (2019.01)
*G06F 16/81* (2019.01)
*G06F 16/958* (2019.01)
*G06F 16/957* (2019.01)
*G06F 40/14* (2020.01)

(52) U.S. Cl.
CPC .............. *G06F 16/86* (2019.01); *G06F 16/81* (2019.01); *G06F 16/9577* (2019.01); *G06F 16/986* (2019.01); *G06F 40/14* (2020.01)

(58) Field of Classification Search
CPC ...... G06F 17/2247; G06F 16/86; G06F 16/81; G06F 16/986; G06F 16/9577; G06F 40/14
See application file for complete search history.

(56) References Cited

U.S. PATENT DOCUMENTS

| 6,925,631 B2 | 8/2005 | Golden |
| 8,335,982 B1 | 12/2012 | Colton et al. |
| 2002/0101431 A1* | 8/2002 | Forney ................. G06F 21/105 345/582 |
| 2010/0332968 A1 | 12/2010 | Squillace |
| 2011/0239106 A1 | 9/2011 | Veselov et al. |

(Continued)

FOREIGN PATENT DOCUMENTS

| RU | 2595524 | 8/2016 |
| WO | WO 2016/190973 | 12/2016 |

OTHER PUBLICATIONS

Elliot Stack Over Flow, Dynamically change html element, pp. 1-4, https://stackoverflow.com/questions/4372318/dynamically-change-html-element, 2013.*

(Continued)

*Primary Examiner* — Cesar B Paula
*Assistant Examiner* — Benjamin J Norris
(74) *Attorney, Agent, or Firm* — Fish & Richardson P.C.

(57) ABSTRACT

Methods, systems, and apparatus, including computer programs encoded on a computer storage medium, for scanning bindings in a webpage. In one aspect, a method includes obtaining, at a browser of a client device, markup for a webpage, initiating a scan of the markup for the webpage to identify bindings in the markup, in response to a time threshold being satisfied during the scan of the markup for the webpage, pausing the scan of the markup and storing location data corresponding to a location in the markup reached by the scan at pause time, rendering, by the browser, a next frame for the webpage, and in response to completion of the rendering of the next frame for the webpage, resuming the scan of the markup for the webpage at the location in the markup.

19 Claims, 3 Drawing Sheets

(56) References Cited

U.S. PATENT DOCUMENTS

| | | | | |
|---|---|---|---|---|
| 2012/0110435 A1* | 5/2012 | Green | ............... | G06F 17/30893 |
| | | | | 715/234 |
| 2012/0274645 A1* | 11/2012 | Ergan | ........................ | G06F 3/14 |
| | | | | 345/473 |
| 2014/0122998 A1* | 5/2014 | Shin | .................... | G06F 17/2247 |
| | | | | 715/234 |
| 2014/0280771 A1* | 9/2014 | Bosworth | ........... | G06F 12/0875 |
| | | | | 709/219 |
| 2017/0031871 A1* | 2/2017 | Nikitin | ................ | G06F 17/3089 |

OTHER PUBLICATIONS

PCT International Preliminary Report on Patentability in International Application No. PCT/US2018/033422, dated Jan. 24, 2020, 8 pages.

International Search Report and Written Opinion issued in International Application No. PCT/US2018/033422, dated Jul. 31, 2018, 13 pages.

RU Office Action in Russian Application No. 2019131592/28, dated Oct. 12, 2020, 17 pages. (with English translation).

\* cited by examiner

SCANNING FOR BINDINGS IN WEBPAGE MARKUP

FIELD

This specification relates to webpage rendering.

BACKGROUND

Computing systems may be used to view webpages. The content and appearance of a webpage may be defined by markup corresponding to a webpage. For example, a web browser may download the markup for a webpage and then render the webpage according the downloaded markup.

SUMMARY

In general, one innovative aspect of the subject matter described in this specification is embodied in methods that include the actions of obtaining, at a browser of a client device, markup for a webpage, initiating a scan of the markup for the webpage to identify bindings in the markup, in response to a time threshold being satisfied during the scan of the markup for the webpage, pausing the scan of the markup and storing location data corresponding to a location in the markup reached by the scan at pause time, rendering, by the browser, a next frame for the webpage, and in response to completion of the rendering of the next frame for the webpage, resuming the scan of the markup for the webpage at the location in the markup.

Other implementations of these aspects include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in certain aspects, the time threshold includes ten through fifty milliseconds. In some aspects, the time threshold includes a predetermined length of time that is less than a length of time that the browser has to render any next frame of a webpage. In some implementations, rendering, by the browser, the next frame for the webpage includes generating a screen, to be displayed on the client device, showing the webpage.

In certain aspects, the markup for the webpage includes text of a markup language and text of a scripting language. In some aspects, initiating a scan of the markup for the webpage to identify bindings in the markup includes parsing text of the markup to identify text that represents links between Hypertext Markup Language attributes of the webpage and expressions. In some implementations, actions include in response to the time threshold being satisfied during the scan of the markup for the webpage that is resumed, pausing the scan of the markup and storing second location data corresponding to a second location in the markup reached by the resumed scan at pause time, rendering, by the browser, a second next frame for the webpage, and in response to completion of the rendering of the second next frame for the webpage, resuming the scan of the markup for the webpage at the second location in the markup.

In certain aspects, actions include in response to identifying each binding, determining whether the binding is included in a predetermined list of bindings. In some aspects, in response to determining that the binding is included in the predetermined list of bindings, processing the binding and continuing the scan of the markup. In some implementations, in response to determining that the binding is not included in the predetermined list of bindings, not processing the binding and continuing the scan of the markup. In certain aspects, the scan of the markup for the webpage begins at the beginning of a document including the markup and moves sequentially through the document to the end of the document.

Particular embodiments of the subject matter described in this specification can be implemented so as to realize one or more of the following advantages. Pausing scanning of a markup may enable the use of bindings in markup while maintaining responsiveness in a webpage. For example, pausing scanning of markup around every twenty milliseconds to render a frame of a webpage and then resuming the scan may ensure that a user sees a response to any user input in a new frame around every twenty milliseconds. In the example, after scanning of the markup is complete, the bindings may be used to dynamically update the webpage.

Pausing that is not dependent on a browser indicating that the browser is idle may enable bindings to be used for browsers that can indicate when a webpage frame is rendered but cannot indicate that the browser is idle. Additionally, use of bindings may reduce bandwidth usage and processing required for user interaction with a webpage. For example, instead of a browser needing to download a new webpage in response to a user interacting with a portion of the webpage and rendering the downloaded new webpage, the browser may instead dynamically update a Hypertext Markup Language (HTML) attribute of a webpage and re-render the webpage with the updated HTML attribute.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Webpage markup may include bindings to enable a webpage to be dynamically changed. For example, webpage markup may include text that defines a binding between an image embedded in a webpage and an option currently selected in a webpage. In the example, when a user selects another option, the web browser may determine that the binding describes that the image embedded in the webpage should change and, in response, show a different embedded image without needing to re-download a different webpage with the different image embedded.

Webpage markup may include markup language, e.g., HTML, XML, etc., and scripting language, Javascript, PHP, etc. A binding may be textual description of a link between an attribute of the webpage and an expression where the value of the attribute is the output of the expression according to a current state of the webpage. For example, a binding may be "<img src='dog.jpg' [src]='currentAnimal'+ '.jpg'>" where "img src" may be a HTML attribute and "'currentAnimal'+'.jpg'" may be the expression linked to the HTML attribute. In the example, the image may show different images depending on a current value for "currentAnimal" which may change depending on what option in a webpage is selected by a user.

To enable bindings to dynamically change a webpage, the browser may need to scan the webpage markup to identify the bindings. For example, the browser may parse through webpage markup from a beginning of a document, e.g., a HTML file, to the end of the document. After the browser scans the entire markup and identifies the bindings, the browser may then determine whether there has been a change in a state of the webpage, whether the change in the state affects any expression of a binding, evaluate any expression that is affected by the state change, and then update any attribute linked to the expression through the binding.

However, scanning a large portion of markup of a webpage may take sufficiently long that a user may believe that a browser is being unresponsive. For example, scanning the entire markup of a webpage may take five hundred milliseconds, one second, two seconds, or five seconds and during that time the webpage may appear to be unresponsive.

Described below are system and method for scan bindings in webpages. Instead of executing scanning markup of a webpage at once, a system may scan markup of a webpage in portions until the entire markup is scanned. For example, a browser may scan as much of the markup as possible in twenty milliseconds, pause the scan to render a frame of the webpage, resume scanning the remaining portion as much as possible in twenty more milliseconds, pause the scan to render another frame of the webpage, and then resume scanning. As used in this specification, and unless otherwise noted, a "frame" is a video from that is an electronically coded still image, and the frames are rendered in sequence to give the appearance of motion. The rendering of a frame of a webpage may be a rendering of screen of a browser showing the webpage. For example, a browser may render twenty, thirty, or forty frames per second of a webpage. The process may be repeated until the entire markup is scanned. This allows for the markup to be scanned incrementally but without the user being able to detect pauses due to the scanning. This results in an improvement of video processing of rendering a markup resource.

These features and additional features are described in more detail below.

Figure 1:
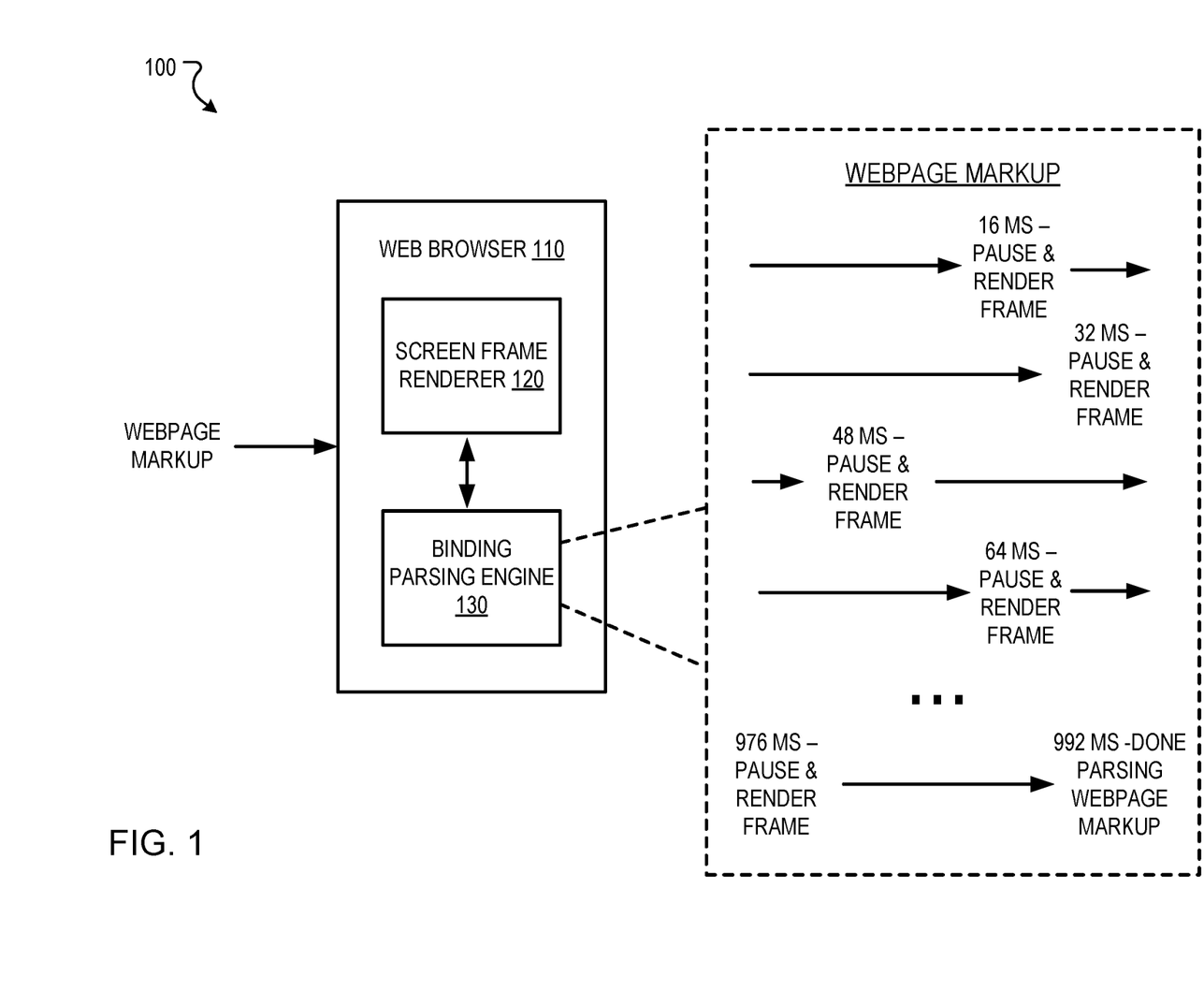
FIG. 1 illustrates a block diagram of an example system that scans bindings in webpage markup.

FIG. 1 illustrates a diagram of an example system 100 that includes a web browser 110. The web browser 110 includes a screen frame renderer 120 and a binding parsing engine 130. The web browser 110 may obtain webpage markup for webpages. For example, the web browser 110 may receive user input of a universal resource locator (URL) address of "www.example.com/example.html" and, in response, obtain an HTML file from a server hosting a webpage corresponding to the URL address. In another example, the web browser 110 may receive a user selection of a link displayed in a webpage and, in response, obtain an HTML file from a server hosting the webpage to which the link references.

The web browser 110 may use the screen frame renderer 120 and the binding parsing engine 130 to allow users of the web browser 110 to interact with the webpage. For example, the web browser 110 may use the screen frame renderer 120 to render frames of the webpage and use the binding parsing engine 130 to identify bindings in the markup of the webpage to enable dynamic changes to the webpage. The web browser 110 may chose at any time to either render a frame of a webpage or parse the markup of the webpage. For example, while the web browser 110 is scanning markup of the webpage, the web browser 110 may not render a frame of the webpage and, while the web browser 110 is rendering a frame of the webpage, the web browser 110 may not be scanning the markup of the web browser 110.

The screen frame renderer 120 may render frames of a webpage according to the markup of the webpage. The screen frame renderer 120 may take into account a location of a cursor and a current view of the webpage. For example, when a user scrolls up or down a webpage or moves a cursor, the next frame generated of the webpage may reflect the different view of the webpage according to the movement up or down the webpage or position of the cursor.

Before the binding parsing engine 130 is done scanning the markup, default values specified in the markup for HTML attributes may be used. For example, a particular example of a binding may be "<img src='dog.jpg' [src]='currentAnimal'+'jpg'>" where "dog.jpg" may be a default value for the HTML attribute "img src." "dog.jpg" may not be dependent on an expression so initially while the webpage is being rendered before the bindings are parsed, the webpage may show an image corresponding to "dog.jpg." Once the binding parsing engine 130 is done scanning the markup, dynamic changes in the webpage according to bindings may then be enabled. For example, once the binding parsing engine 130 is done scanning the markup, the web browser 110 may then have the image show whatever image corresponds to the evaluation of the expression "'currentAnimal'+'jpg'". For example, if the value of "currentAnimal" is "cat," then the screen frame renderer 120 may render an image corresponding to "cat.jpg."

The binding parsing engine 130 may scan markup of a webpage to identify bindings in the markup. For example, the binding parsing engine 130 may parse through textual characters in the markup language to identify sequences of textual characters that correspond to a HTML attribute and a corresponding expression for determining a value for the attribute.

As the web browser 110 may appear to be unresponsive from the time between a user provides input and the next frame of the webpage is rendered, the web browser 110 may attempt to render at least a certain number of frames of the webpage a second. For example, the web browser 110 may attempt to render sixty frames a second so may output a next frame every sixteen milliseconds. Other numbers of frames per second may alternatively be output. For example, the web browser 110 may attempt to output thirty, forty, ninety, or some other number of frames per second. During the time between when frames are rendered by the screen frame renderer 120, the web browser 110 may use the binding parsing engine 130 to scan the markup of the webpage for bindings.

The web browser 110 may pause scanning by the binding parsing engine 130 after a time threshold of scanning. For example, the web browser 110 may pause scanning by the binding parsing engine 130 each time the binding parsing engine 130 has scanned for sixteen milliseconds so that a frame may be rendered every sixteen milliseconds. Other time thresholds may be used that are predetermined lengths of time less than a length of time that the web browser 110 has to render a next frame of a webpage. For example, if the web browser 110 is to render twenty five frames per second the time threshold may be any length of time forty milliseconds or less.

In some implementations, the web browser 110 may perform other processing other than scanning and rendering a frame itself may take some time. Accordingly, the time threshold for scanning may take the additional time needed into account so that the web browser 110 may output enough frames per second. For example, if the web browser is to output sixty frames per second so should render a frame at least every sixteen milliseconds, rendering a frame takes two milliseconds, and processing other than scanning takes five milliseconds, time threshold may be nine milliseconds and the binding parsing engine 130 may have the remaining nine milliseconds every time a frame is rendered to scan the markup.

Each time the binding parsing engine 130 pauses the scanning to render a frame, the binding parsing engine 130 may store location data corresponding to a location in the markup reached by the scan at pause time. For example, after the first ten milliseconds of scanning, the binding parsing engine 130 may have finished scanning up to the five hundredth American Standard Code for Information Interchange (ASCII) character in the markup and store location data of five hundred to indicate scanning has reached the five hundredth ASCII character in the markup.

Each time the binding parsing engine 130 resumes scanning after a frame is rendered, the binding parsing engine 130 may resume the scanning from the location indicated by the stored location data. For example, in response the resuming scanning, the binding parsing engine 130 may determine that the value of the stored location data indicates five hundred and, in response, resume scanning for ASCII characters after the five hundredth character in the markup of the webpage.

Unlike the screen frame renderer 120 continuously rendering frames of the webpage until the web browser 110 loads another webpage, once the binding parsing engine 130 is done scanning a webpage, the binding parsing engine 130 may no longer need to scan the webpage as the markup of the webpage may not change.

The screen frame renderer 120 may begin rendering a frame in response to an indication to render the frame and may provide an indication that rendering of the frame is complete. For example, the screen frame renderer 120 may receive an instruction from the web browser 110 indicating that the screen frame renderer 120 should render a frame and, in response, begin rendering a frame. In the example, once the screen frame renderer 120 is done rendering a frame, the screen frame renderer 120 may output a frame render complete signal. The web browser 110 may detect the frame render complete signal and then trigger the binding parsing engine 130 to resume scanning the markup of the webpage. Once the time threshold is satisfied, the web browser 110 may again instruct the screen frame renderer 120 to render another frame.

In some implementations, the web browser 110 may obtain markup of a webpage and have the binding parsing engine 130 begin scanning the markup before rendering a frame for the webpage. For example, the web browser 110 may instruct the binding parsing engine 130 to scan markup for a webpage for sixteen milliseconds and then render a frame. In other implementations, the web browser 110 may obtain markup of a webpage and have the screen frame renderer 120 render a frame before scanning the markup for the webpage. For example, the web browser 110 may instruct the screen frame renderer 120 to render a frame of the webpage and then instruct binding parsing engine 130 to scan markup for a webpage for sixteen milliseconds and then render another frame.

In some implementations, the binding parsing engine 130 may determine whether a binding is valid after identifying the binding. For example, the binding parsing engine 130 may determine that a particular binding that is identified is valid or invalid. The binding parsing engine 130 may determine whether a binding is valid by determining whether the binding is included in a predetermined list of bindings. For example, the binding parsing engine 130 may obtain a list of types of HTML attributes to which expressions may be linked and the types of expressions that are valid for particular HTML attributes. In the example, once a binding is identified, the binding parsing engine 130 may determine whether the type of HTML attribute to which the binding links is indicated in the list as a valid and whether the type of expression to which the binding links is indicated in the list as valid for the type of HTML attribute.

In response to determining a binding is valid, the binding parsing engine 130 may then process the binding by monitoring for changes in state that change the evaluation of the expression corresponding to the binding so that the HTML attribute that corresponds to the binding may be updated once those changes in state occur. In response to determining that a binding is invalid, the binding parsing engine 130 may not process the binding by ignoring the binding or not monitoring for changes in state that change the evaluation of the expression corresponding to the binding.

Figure 2:
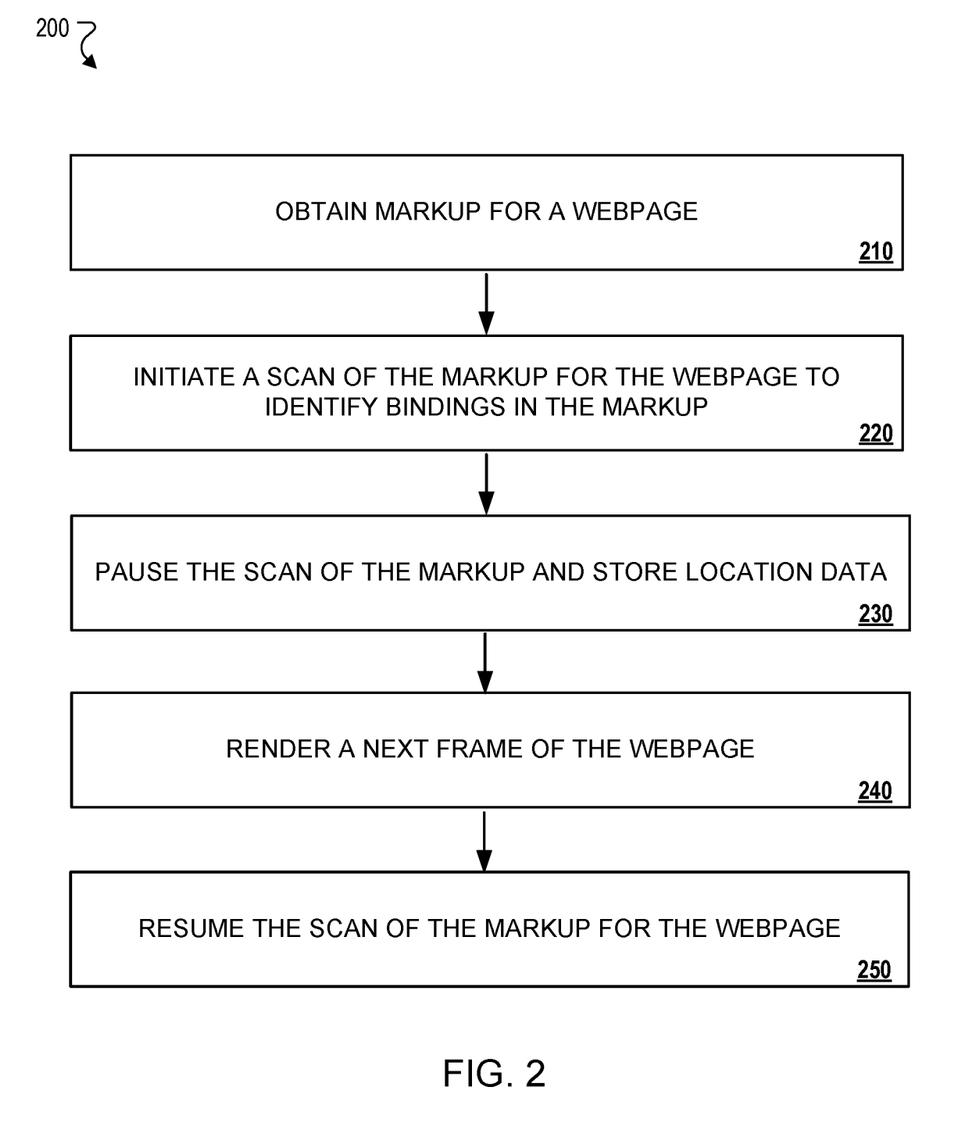
FIG. 2 is a flow diagram of an example process for scanning bindings in webpage markup.

FIG. 2 is a flow diagram of an example process 200 for scanning bindings in a webpage markup. Process 200 can be implemented using system 100 described above. For example, the process 200 may be performed by the web browser 110, screen frame renderer 120, and binding parsing engine 130.

The process 200 includes obtaining markup for a webpage (210). For example, the web browser 110 may obtain markup for a webpage corresponding to a URL address "http://www.example.com/example.html" input by a user.

The process 200 includes initiating a scan of the markup for the webpage to identifying bindings in the markup (220). For example, the web browser 110 may instruct the binding parsing engine 130 to initiate scanning of the markup from a beginning of the markup.

The process 200 includes pausing the scan of the markup and storing location data (230). For example, the binding parsing engine 130 may scan the markup for five milliseconds from the first character to the three hundredth ASCII character in the markup, pause the scan, and then store location data indicating a position in the markup corresponding to the three hundred and first ASCII character.

The process 200 includes rendering a next frame of the webpage (240). For example, the web browser 110 may instruct the screen frame renderer 120 to render an initial frame that is a screen showing the webpage.

The process 200 includes resuming the scan of the markup for the webpage (250). For example, the web browser 110 may receive an indication from the screen frame renderer 120 that a next frame is done being rendered and, in response, instruct the binding parsing engine 130 to resume scanning. In the example, the binding parsing engine 130 may then obtain the stored location data, determine that the data indicates the position in the markup to resume scanning is the three hundredth and first ASCII character in the markup, and then resume scanning for five more milliseconds from the three hundredth and first ASCII character in the mark.

Figure 3:
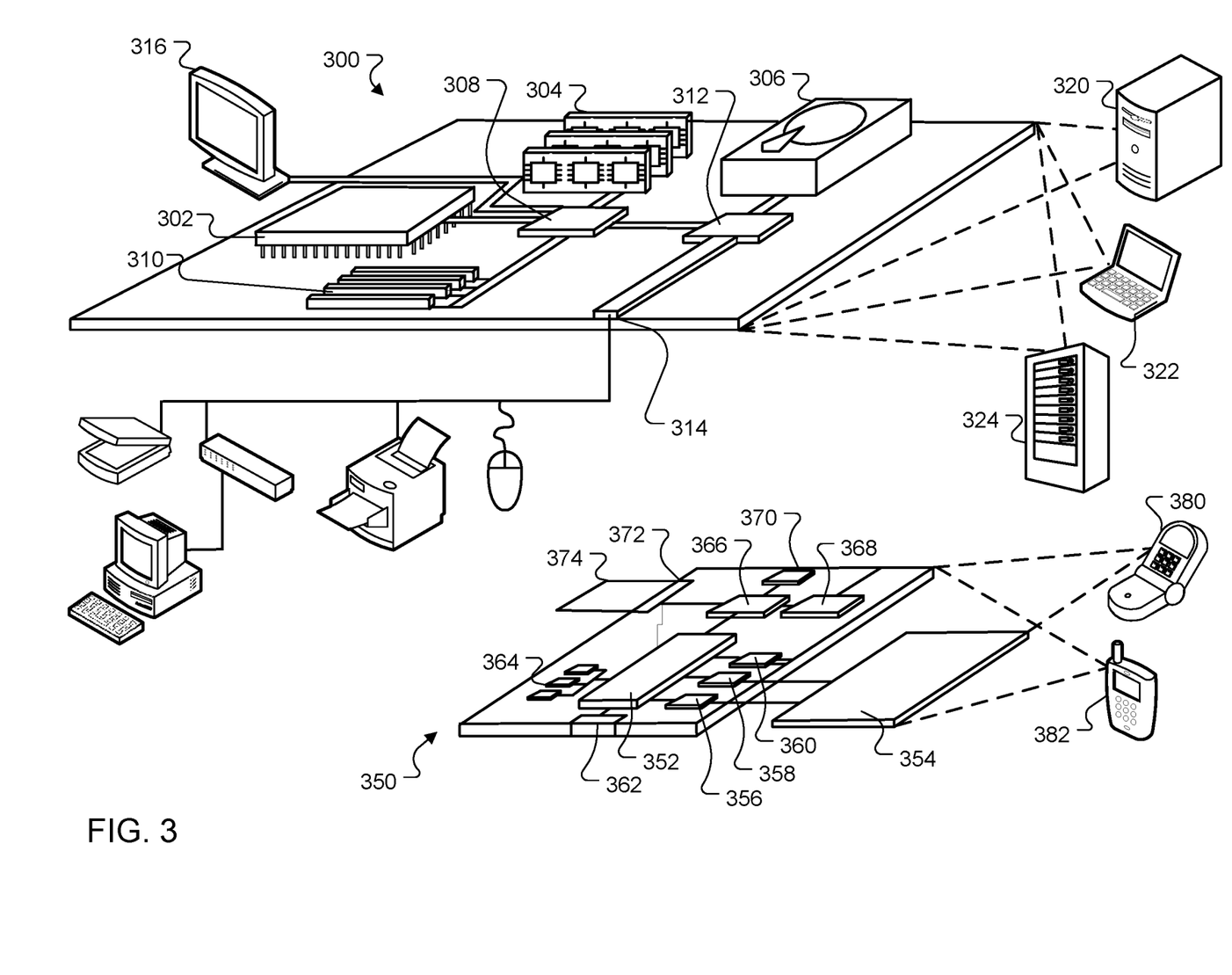
FIG. 3 is a block diagram of a computing system that can be used in connection with computer-implemented methods described in this specification.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a graphical user interface (GUI) on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provided as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed.

For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, the method comprising:
    obtaining, at a browser of a client device, markup for an entire webpage;
    after the markup for the entire webpage is obtained, initiating a scan of the markup for the webpage to identify bindings in the markup,
        where each of the bindings is a markup tag that includes (i) a default value for an attribute before completion of the scan of the markup for the webpage to identify bindings in the markup and (ii) a textual description of a link between the attribute of the webpage and an expression that defines a value of the attribute is an output of the expression according to a current state of the webpage after completion of the scan of the markup for the webpage to identify bindings in the markup;
    in response to a time threshold being satisfied during the scan of the markup for the webpage, pausing the scan of the markup and storing location data corresponding to a location in the markup reached by the scan at a pause time;
    rendering, by the browser and before enabling an appearance of the webpage to dynamically change based on the values of the attributes output from the expressions in accordance with the bindings, a next frame for the webpage based on the default values for the attributes in accordance with the markup;
    in response to completion of the rendering of the next frame for the webpage by the browser, resuming the scan of the markup for the webpage from the location in the markup reached by the scan at the pause time; and
    in response to completion of the scan to identify the bindings in the webpage, enabling the appearance of the webpage to dynamically change based on the values of the attributes output from the expressions instead of the default values in accordance with the bindings that were identified.

2. The method of claim 1, wherein the time threshold comprises ten through fifty milliseconds.

3. The method of claim 1, wherein the time threshold comprises a predetermined length of time that is less than a length of time that the browser has to render any next frame of a webpage.

4. The method of claim 1, wherein rendering the next frame for the webpage comprises:
    generating a screen, to be displayed on the client device, showing the webpage.

5. The method of claim 1, wherein the markup for the webpage comprises text of a markup language and text of a scripting language.

6. The method of claim 1, wherein an attribute of the webpage comprises a Hypertext Markup Language attribute of the webpage.

7. The method of claim 1, comprising:
    in response to the time threshold being satisfied during the scan of the markup for the webpage that is resumed, pausing the scan of the markup and storing second location data corresponding to a second location in the markup reached by the resumed scan at pause time;
    rendering, by the browser, a second next frame for the webpage; and
    in response to completion of the rendering of the second next frame for the webpage, resuming the scan of the markup for the webpage at the second location in the markup.

8. The method of claim 1, comprising in response to identifying each binding, determining whether the binding is included in a predetermined list of bindings.

9. The method of claim 8, comprising in response to determining that the binding is included in the predetermined list of bindings, processing the binding and continuing the scan of the markup.

10. The method of claim 8, comprising in response to determining that the binding is not included in the predetermined list of bindings, not processing the binding and continuing the scan of the markup.

11. The method of claim 1, wherein the scan of the markup for the webpage begins at the beginning of a document including the markup and moves sequentially through the document to the end of the document.

12. The method of claim 1, wherein in response to completion of the scan to identify the bindings in the webpage, enabling the appearance of the webpage to dynamically change based on the values of the attributes output from the expressions instead of the default values in accordance with the bindings that were identified comprises:
    in response to completion of the scan to identify the bindings in the webpage, evaluating the expressions and updating attributes linked to the expressions through the bindings;

determining that a change in the state affects the expression of a particular binding of the bindings n the markup;

evaluating the expression that is determined to be affected by the state change; and updating the attribute linked to the expression through the particular binding.

13. The method of claim 1, wherein in response to completion of the rendering of the next frame for the webpage by the browser, resuming the scan of the markup for the webpage from the location in the markup reached by the scan at the pause time comprises:

resuming the scan of the markup for the webpage from midway through the markup, where the markup that is before the location has already been scanned, the markup after the location has not yet been scanned, and before the scan was paused the markup had been obtained in its entirety by the client device.

14. A system comprising:

a data processing apparatus; and a non-transitory computer readable storage medium in data communication with the data processing apparatus and storing instructions executable by the data processing apparatus and upon such execution cause the data processing apparatus to perform operations comprising:

obtaining, at a browser of a client device, markup for an entire webpage;

after the markup for the entire webpage is obtained, initiating a scan of the markup for the webpage to identify bindings in the markup, where each of the bindings is a markup tag that includes (i) a default value for an attribute before completion of the scan of the markup for the webpage to identify bindings in the markup and (ii) a textual description of a link between the attribute of the webpage and an expression that defines a value of the attribute is an output of the expression according to a current state of the webpage after completion of the scan of the markup for the webpage to identify bindings in the markup;

in response to a time threshold being satisfied during the scan of the markup for the webpage, pausing the scan of the markup and storing location data corresponding to a location in the markup reached by the scan at a pause time;

rendering, by the browser and before enabling an appearance of the webpage to dynamically change based on the values of the attributes output from the expressions in accordance with the bindings, a next frame for the webpage based on the default values for the attributes in accordance with the markup;

in response to completion of the rendering of the next frame for the webpage by the browser, resuming the scan of the markup for the webpage from the location in the markup reached by the scan at the pause time; and in response to completion of the scan to identify the bindings in the webpage, enabling the appearance of the webpage to dynamically change based on the values of the attributes output from the expressions instead of the default values in accordance with the bindings that were identified.

15. The system of claim 14, wherein the time threshold comprises ten through fifty milliseconds.

16. The system of claim 14, wherein the time threshold comprises a predetermined length of time that is less than a length of time that the browser has to render any next frame of a webpage.

17. The system of claim 14, wherein rendering the next frame for the webpage comprises:

generating a screen, to be displayed on the client device, showing the webpage.

18. The system of claim 14, wherein the markup for the webpage comprises text of a markup language and text of a scripting language.

19. A non-transitory computer readable storage medium storing instructions executable by a data processing apparatus and upon such execution cause the data processing apparatus to perform operations comprising:

obtaining, at a browser of a client device, markup for an entire webpage;

after the markup for the entire webpage is obtained, initiating a scan of the markup for the webpage to identify bindings in the markup, where each of the bindings is a markup tag that includes (i) a default value for an attribute before completion of the scan of the markup for the webpage to identify bindings in the markup and (ii) a textual description of a link between the attribute of the webpage and an expression that defines a value of the attribute is an output of the expression according to a current state of the webpage after completion of the scan of the markup for the webpage to identify bindings in the markup;

in response to a time threshold being satisfied during the scan of the markup for the webpage, pausing the scan of the markup and storing location data corresponding to a location in the markup reached by the scan at a pause time;

rendering, by the browser and before enabling an appearance of the webpage to dynamically change based on the values of the attributes output from the expressions in accordance with the bindings, a next frame for the webpage based on the default values for the attributes in accordance with the markup;

in response to completion of the rendering of the next frame for the webpage by the browser, resuming the scan of the markup for the webpage from the location in the markup reached by the scan at the pause time; and in response to completion of the scan to identify the bindings in the webpage, enabling the appearance of the webpage to dynamically change based on the values of the attributes output from the expressions instead of the default values in accordance with the bindings that were identified.

* * * * *

UNITED STATES PATENT AND TRADEMARK OFFICE
CERTIFICATE OF CORRECTION

| | |
|---|---|
| PATENT NO. | : 10,956,498 B2 |
| APPLICATION NO. | : 15/720832 |
| DATED | : March 23, 2021 |
| INVENTOR(S) | : Chou et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 15 days.

Signed and Sealed this
Thirty-first Day of January, 2023

Katherine Kelly Vidal
*Director of the United States Patent and Trademark Office*